(12) United States Patent
Caudill (10) Patent No.: US 11,009,849 B1
(45) Date of Patent: May 18, 2021

(54) METER HUB SAFETY ISOLATION SERVICE ENTRANCE DISCONNECT SWITCH

(71) Applicant: Willie Sam Caudill, Tobaccoville, NC (US)

(72) Inventor: Willie Sam Caudill, Tobaccoville, NC (US)

(*) Notice: Subject to any disclaimer, the term of this patent is extended or adjusted under 35 U.S.C. 154(b) by 90 days.

(21) Appl. No.: 16/292,839

(22) Filed: Mar. 5, 2019

Related U.S. Application Data (60) Provisional application No. 62/710,993, filed on Mar. 6, 2018.

(51) Int. Cl.
  *H02G 3/08* (2006.01)
  *G05B 19/406* (2006.01)

(52) U.S. Cl.
  CPC ........... *G05B 19/406* (2013.01); *H02G 3/081* (2013.01); *H02G 3/088* (2013.01); *G05B 2219/33185* (2013.01); *G05B 2219/50193* (2013.01)

(58) Field of Classification Search
  CPC ........ G05B 19/406; G05B 2219/33185; G05B 2219/50193; H02G 3/081; H02G 3/088
  See application file for complete search history.

(56) References Cited

U.S. PATENT DOCUMENTS

| 385,826 | A | 7/1888 | Sechrist | |
|---|---|---|---|---|
| 1,213,073 | A | 1/1917 | Carr | |
| 1,557,394 | A | 10/1925 | Anderson | |
| 1,561,303 | A | 11/1925 | Baxter | |
| 1,609,223 | A | 11/1926 | Trumbull | |
| 1,617,040 | A | 2/1927 | Zimmer | |
| 1,638,828 | A | 8/1927 | Carling | |
| 1,652,541 | A | 12/1927 | Neil | |
| 1,664,380 | A | 3/1928 | Meyers | |
| 1,795,434 | A | 3/1931 | Leppert | |
| 2,479,266 | A | 8/1949 | Rowe | 200/67 |
| 2,807,684 | A | 9/1957 | Ayers | 200/67 |
| 3,134,877 | A | 5/1964 | Ericson | 200/153 |
| 3,158,701 | A | 11/1964 | Nadeau | 200/50 |
| 3,246,100 | A | 4/1966 | Russell | 200/92 |

(Continued)

OTHER PUBLICATIONS

"2005 NEC Changes Summary Articles 700 through 702," National Electrical Code.

(Continued)

*Primary Examiner* — Dinh T Le
(74) *Attorney, Agent, or Firm* — MacCord Mason PLLC (57) ABSTRACT

A meter hub safety isolation service entrance disconnect switch includes an enclosure configured to mount outside a building and protect contents of the enclosure from ingress of solid foreign objects or the ingress of rain, sleet, or snow and that will be undamaged by the external formation of ice on the enclosure. The enclosure has a dead front cover and removable outside cover in which the outside cover is marked to inform a first responder that the enclosure contains a disconnect switch. The disconnect switch is operable upon removal of the outside cover while the dead front cover remains in place and includes a multi-pole switch having poles sufficient to convey power, neutral and ground as may be required by an electrical power source for a load center serving the premises, the switch opening poles for power and neutral upon actuation, while maintaining the ground of the premises wiring.

49 Claims, 10 Drawing Sheets

(56) References Cited

U.S. PATENT DOCUMENTS

| | | | | |
|---|---|---|---|---|
| 3,369,100 | A | 2/1968 | Kussy et al. | 200/172 |
| 3,432,628 | A | 3/1969 | Peutz | 200/50 |
| 3,492,448 | A | 1/1970 | Phillips, Jr. | 200/50 |
| 3,510,612 | A | 5/1970 | Ward | 200/50 |
| 3,647,997 | A | 3/1972 | Nerem | 200/50 |
| 3,654,484 | A | 4/1972 | Jorgenson et al. | 307/49 |
| 3,705,280 | A | 12/1972 | Harms | 200/50 |
| 3,753,047 | A * | 8/1973 | Shallbetter | H02B 1/50 361/672 |
| 3,767,872 | A | 10/1973 | Whitchurch | 200/50 |
| 3,778,633 | A | 12/1973 | De Visser et al. | 307/64 |
| 3,789,169 | A | 1/1974 | Yazvac | 200/50 |
| 3,801,758 | A | 4/1974 | Shand et al. | 200/50 |
| 3,906,295 | A * | 9/1975 | Tessmer | H02B 1/50 361/643 |
| 3,936,782 | A | 2/1976 | Moakler et al. | 335/161 |
| 4,034,170 | A | 7/1977 | Raabe et al. | 200/50 |
| 4,113,334 | A | 9/1978 | Instone | 339/22 |
| 4,270,031 | A | 5/1981 | Borona et al. | 200/50 |
| 4,510,357 | A | 4/1985 | Winterbottom | 200/50 |
| 4,590,387 | A | 5/1986 | Yoshida et al. | 307/64 |
| 4,724,512 | A | 2/1988 | Bischof et al. | 361/357 |
| 4,760,278 | A | 7/1988 | Thomson | 307/64 |
| 4,791,255 | A | 12/1988 | Eliezer | 200/144 |
| 4,827,089 | A | 5/1989 | Morris et al. | 200/50 |
| 4,902,859 | A | 2/1990 | Witzmann et al. | 200/50 |
| 4,924,041 | A | 5/1990 | Yee | 200/50 |
| 4,999,598 | A | 3/1991 | Jannesari et al. | 335/122 |
| 5,008,499 | A | 4/1991 | Yee et al. | 200/50 |
| 5,136,463 | A * | 8/1992 | Webster | H02B 1/305 174/38 |
| 5,397,868 | A | 3/1995 | Smith et al. | 200/18 |
| 5,422,453 | A | 6/1995 | Smith et al. | 200/329 |
| 5,648,646 | A | 7/1997 | Flegel | 200/50.32 |
| 5,725,085 | A | 3/1998 | Seymour et al. | 200/50.33 |
| 5,761,027 | A | 6/1998 | Flegel | 361/664 |
| 5,790,369 | A | 8/1998 | Sitler | 361/643 |
| 5,814,777 | A | 9/1998 | Green et al. | 200/50.33 |
| 5,879,184 | A * | 3/1999 | Lopez | H01R 13/5213 307/141 |
| 5,914,467 | A | 6/1999 | Jonas et al. | 200/1 |
| 5,977,492 | A | 11/1999 | Taylor et al. | 200/50.32 |
| 6,069,328 | A | 5/2000 | Oravetz et al. | 200/50.33 |
| 6,096,986 | A | 8/2000 | Flegel | 200/50.33 |
| 6,169,340 | B1 | 1/2001 | Jones | 207/64 |
| 6,180,897 | B1 | 1/2001 | Montague et al. | 200/50.35 |
| 6,184,595 | B1 | 2/2001 | Flegel, Jr. | 307/114 |
| 6,521,849 | B1 | 2/2003 | Flegel | 200/50.32 |
| 6,538,223 | B1 | 3/2003 | Yoshida et al. | 200/401 |
| 6,541,719 | B1 | 4/2003 | Powell | 200/50.32 |
| 6,570,269 | B2 | 5/2003 | McMillan et al. | 307/64 |
| 6,621,689 | B1 | 9/2003 | Flegel | 361/631 |
| 6,680,445 | B1 | 1/2004 | Oravetz et al. | 200/50.33 |
| 6,784,385 | B2 * | 8/2004 | Hernandez-Perez | H02B 1/03 200/50.33 |
| 6,815,623 | B1 | 11/2004 | Holland | 200/50.32 |
| D499,700 | S | 12/2004 | Raabe et al. | D13/160 |
| 6,861,596 | B2 | 3/2005 | Schnackenberg | 200/43.01 |
| 7,005,590 | B1 | 2/2006 | Willis | 200/50.32 |
| 7,268,308 | B1 | 9/2007 | Caudill et al. | 200/50.35 |
| 7,361,832 | B2 * | 4/2008 | Dively | H02G 3/0493 174/37 |
| 7,408,476 | B1 * | 8/2008 | Beaton | H01H 9/287 340/426.24 |
| 7,471,195 | B2 * | 12/2008 | Roark | H02H 5/00 340/3.1 |
| 8,138,433 | B2 | 3/2012 | Czarnecki et al. | 200/50.32 |
| 8,514,551 | B2 | 8/2013 | Cosley et al. | 361/632 |
| 8,803,369 | B1 * | 8/2014 | Caudill | H01H 9/26 307/139 |
| 8,902,570 | B2 * | 12/2014 | Cosley | H02B 1/42 361/632 |
| 2010/0038966 | A1 | 2/2010 | Espeut, Jr. | 307/68 |

OTHER PUBLICATIONS

"How to Operate a Portable Generator Safely," North Carolina's Elec. Cooperatives—admitted prior art.

"Guide to Installing a Standby Backup Generator," Dakota Electric Ass'n.—admitted prior art.

"Safely Installing Your Standby Electric Generator," Flathead Electric Cooperative—admitted prior art.

General Electric—TCAL25 https://www.qualityswitchgear.com/products/accessories-and-parts/tcal25/ Feb. 20, 2019 p. 1-3.

"NEMA Enclosure Types" National Electrical Manufactrers Association 1300 N. 17th street, Suite 1752 Rosslyn, VA 22209 Approved by NEMA Enclosures Sectoin Nov. 2005 p. 1-9.

"Meter Matters An NEC proposal is designed to protect first responders" by Jeffrey Sargent Siemens https:www.nfpa.org/News-and-Research/Publications/NFPA-Journal/2016/March-April-2016/In-Compliance/NFPA-70 p. 1-2.

"In Compliance NEC NEC considers revision to allow responders to shut off power to one- and two- family dwellings" by Derek Vigstol http://www.nfpa.org/News-and-Research/Publications/NFPA-Journal/2018/March-April-2018/In-Compliance/NFPA-70 p. 1-3.

* cited by examiner

METER HUB SAFETY ISOLATION SERVICE ENTRANCE DISCONNECT SWITCH

BACKGROUND OF THE INVENTION

Residential and commercial buildings have wires connected to a utility grid, and the point of connection is usually called a service entrance. A meter at the service entrance measures the consumption of electricity at the building for billing purposes. In addition to electricity for the electrical grid, it is common for buildings to have back-up generators or other alternate power sources, and those are typically connected at the service entrance.

The National Fire Protection Association (NFPA) requires a first responder service entrance disconnect to be placed on the exterior of the building, which has caused the need for a safe means to remove current from the premises wiring during emergencies such as fire. United States Occupational Safety and Health Administration (OSHA) Article 1910 sub-part S and article 1926 sub part K states that an employer is responsible and held accountable for removing all known hazards from the work place of their workers before work begins. Accordingly there is a need for a switch that enables the removal of electrical sources that can cause cardiac arrest from electrical shock to firefighters or other first responders extinguishing the fire.

In addition, back-feeding of current from an alternate power source (such as a generator used at the premises when the utility grid source has failed, photovoltaic arrays, wind turbines and batteries) endangers line repair persons attempting repair to power lines. There is also a need to reduce these dangers to line repair personnel.

SUMMARY OF THE DISCLOSURE

The present invention fulfills one or more of these needs in the art by providing a meter hub safety isolation service entrance disconnect switch. An enclosure is provided configured to mount outside a building to protect the contents of the enclosure from ingress of solid foreign objects or the ingress of rain, sleet, or snow and that will be undamaged by the external formation of ice on the enclosure. The enclosure has a dead front cover and removable outside cover. The outside cover is marked to inform a first responder that the enclosure contains a safety isolation service entrance disconnect. The disconnect is operable upon removal of the outside cover while the dead front cover remains in place and includes a multi-pole switch having poles sufficient to convey power, neutral and ground as may be required by an electrical power source for a load center serving the premises. The switch opens the poles for power and neutral upon actuation.

An actuator for the multi-pole switch may be located behind the outside cover. The emergency isolation disconnect is typically not operable while the outside cover is in place if it is of the manual operation style. Alternatively, the outside cover has a door to provide access to the disconnect switch.

The emergency isolation disconnect may include first and second switches for multiple poles and a linkage between the first and second switches configured such that one switch may be closed while the other switch remains open. The first and second switches are preferably circuit breakers and may have wire bend reducers interposed between poles of the circuit breakers and wires that are electrically connected to the circuit breakers. One of the wire bend reducers may be L-shaped with one leg of the L-shaped wire bend reducer connected to a pole of a circuit breaker and an upstanding leg of the L-shaped wire bend reducer connected at two points to wires. One of the wire bend reducers may be U-shaped with one leg of the U-shaped wire bend reducer connected to a pole of a circuit breaker and a laterally extending leg of the U-shaped wire bend reducer connected at two points to wires.

The disconnect may include first and second switches having a mechanism configured to power a pivotal fulcrum for positioning an extension about the switches for moving the switches independently between open and closed positions.

The enclosure is preferably configured to mount adjacent an enclosure for a meter hub. The enclosure may have a cut-out for mating to a meter hub. In addition to the cut-out, the enclosure may have a knockout to form a hole for wires for power supplied by an alternate source.

The disconnect is preferably wired so that the switch removes current from a premises wiring to protect first responders during emergencies while maintaining a ground connection to the premises wiring. The switch removes current from a premises wiring to make current back feeding impossible to protect line repair personnel repairing downed power lines. The switch normally supplies a load center with the proper voltage and amperage from a utility grid to serve the premises. The switch may also supply the load center with the proper voltage and amperage from a power supplied by an alternate source to serve the premises. In such a case, the switch isolates power supplied by a utility grid from an alternate source of power. Preferably, the switch isolates the premises from power supplied by a utility grid including current carrying conductors including the neutral and ground circuits while maintaining the premises wiring ground connected to the ground electrode. When used with an alternate power source, the switch isolates power supplied by power supplied by an alternate source from the load center to the premises including current carrying conductors including the neutral and ground circuits while keeping the premises wiring ground connected to the ground electrode.

In non-emergency situations, the power supplied by an alternate source supplies the load center to the premises while the power supplied by a utility grid is off and isolated via a transfer switch. The disconnect shares the ground electrode with the premises and power supplied by a utility grid when the power supplied by an alternate source is off and completely isolated. The disconnect shares the ground electrode with the premises and the power supplied by an alternate source when power supplied by a utility grid off and completely isolated.

The switch may have three positions with one position allowing the power supplied by a utility grid to supply current to the load center to the premises while power supplied by an alternate source is off and completely isolated.

The switch may have an automatic control to operate automatically. The automatic control may use a means to position the switch in the desired position, for example, a mechanical auger powered by an electric motor to position the switch in the desired position or a solenoid to position the switch in the desired position.

The switch may have an alarm that is triggered when the switch is actuated. The alarm may be selected from the group consisting of calling an emergency service, turning on lights, sounding a siren, and more than one of them.

The switch may include first and second switches that have an automatic control having a pivotal fulcrum on a utility side to throw the first switch to disconnect a load center from power supplied by a utility grid. The switch may include first and second switches that have an automatic control having a pivotal fulcrum on an alternate side to throw the second switch to connect a load center to power supplied by an alternate source. The first and second switches may have an automatic control that is capable of choosing which fulcrum to use.

The switch may have a voltage capacitor or surge suppressor to eliminate arc flash during operation. The switch may be in the form of at least one circuit breaker to provide overload protection.

The switch should be designed to meet National Electrical Code 230.74 by opening all poles to provide isolation of wiring of the premises from power supplied by a utility grid and power supplied by an alternate source while maintaining a ground connection of the wiring of the premises. The switch should also meet National Electrical Code 230.75 by removing source current that may flow from a utility grid ground or from an alternate source ground from the premises wiring while allowing premises wiring to remain connected to ground.

The enclosure may be configured to interface with existing meter hubs or new meter hubs. The switch may have at least one wire bend reducer to enable easy assembly and installation. In a dual source current supply arrangement, the switch may include first and second switches that have a single control lever that is operable to disconnect all sources of current from the premises wiring. By opening all circuits and thereby preventing current flow at the meter, the switch may allow a meter to be removed safely.

A plurality of disconnect switches can be mounted downstream of the meter hub so a switch in each enclosure can control source current in multi-meter current operations.

The switch may permit a meter hub unit to serve as a temporary or permanent service entrance disconnect switch for new construction to allow power supplied by an alternate source before power grid connection.

The invention can also be considered as a meter hub safety isolation service entrance disconnect switch that includes an enclosure configured to mount outside a building and protect contents of the enclosure from ingress of solid foreign objects or the ingress of rain, sleet, or snow and that will be undamaged by the external formation of ice on the enclosure, the disconnect within the enclosure a multi-pole switch having poles sufficient to convey power, neutral and ground as may be required by an electrical power source for a load center serving premises, the switch opening poles for power and neutral upon actuation, and an automatic control including means to position the multi-pole switch in the desired position and to receive a signal to open the poles of the multi-pole switch.

One means to position the switch in the desired position can be a mechanical auger powered by an electric motor to position the switch in the desired position. Another means uses a solenoid to position the switch in the desired position.

The disconnect's first and second switches may have an automatic control having a pivotal fulcrum on a utility side to throw the first switch to disconnect a load center from power supplied by a utility grid. The first and second switches may have an automatic control having a pivotal fulcrum on an alternate side to throw the second switch to connect a load center to power supplied by an alternate source.

BRIEF DESCRIPTION OF THE DRAWINGS

The invention will be better understood by a reading of the Detailed Description of the Examples of the Invention along with a review of the drawings, in which.

DETAILED DESCRIPTION OF EXAMPLES OF THE INVENTION

Figure 1:
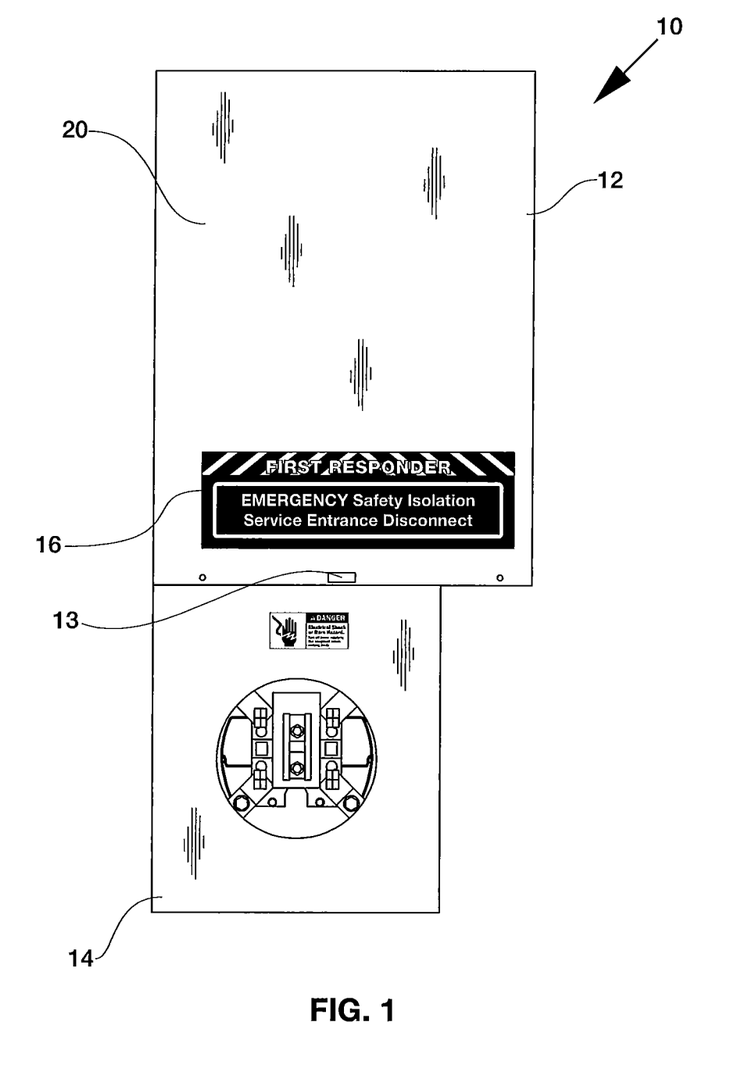
FIG. 1 shows an outer cover of the enclosure in accordance with an embodiment of the invention adjacent a conventional meter hub.

As seen in FIG. 1, the disconnect 10 switch is housed in an enclosure 12 to be placed at the meter hub 14 and marked First Responder Emergency Safety Isolation Service Entrance Disconnect 16 or similar information to the first responder to let him or her know that the contents of the enclosure 12 can be used to isolate the premises from electrical current.

The enclosure for the First Responder Emergency Safety Isolation Disconnect Switch is a Rain-tight Enclosure meeting the requirements of the National Electrical Manufacturers Association (NEMA) 3R, namely "Enclosures constructed for either indoor or outdoor use to provide a degree of protection to personnel against access to hazardous parts; to provide a degree of protection of the equipment inside the enclosure against ingress of solid foreign objects (falling dirt); to provide a degree of protection with respect to harmful effects on the equipment due to the ingress of water (rain, sleet, snow); and that will be undamaged by the external formation of ice on the enclosure."

The 3R rain tight enclosure 12 mates to new or existing UL-listed meter hub 14 enclosures using a four bolt pattern, maintaining the rain-tight feature of both enclosures. By mating of the switch to the meter hub, First Responders have easy access to a switch to remove current from the premises wiring using one easily accessible control (in single source or dual source current) before attempting to extinguish the fire, protecting them from cardiac arrest due to electrical shock. The 3R rain tight enclosure is a secure enclosure that can also house keys to the premises and thereby aid first responders to reduce response time.

Figure 1A:
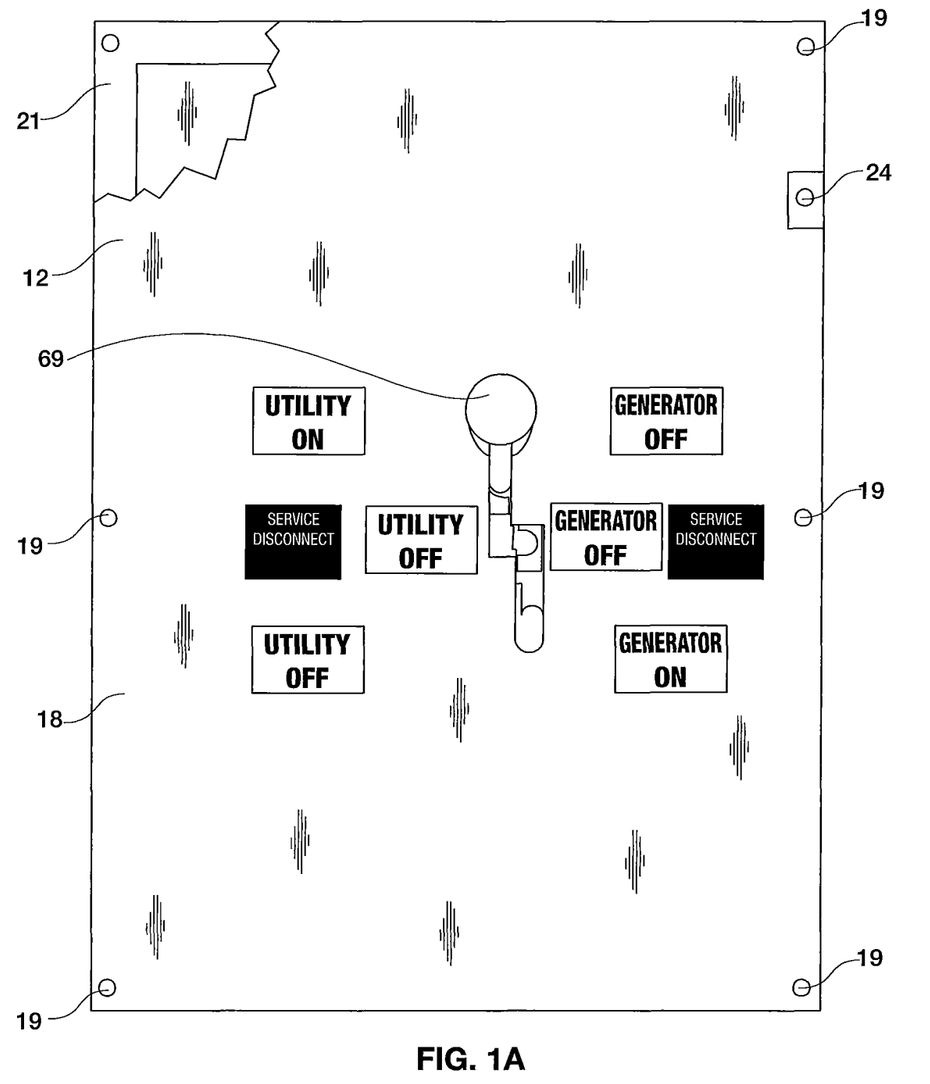
FIG. 1A shows a front view of a dead front cover with protruding lever and informing labels.

One embodiment of the enclosure is 15 inches wide, 20 inches high and 6 inches deep. The enclosure has a dead front cover 18 (See FIG. 1A) behind the outside cover 20 seen in FIG. 1. The dead front cover 18 is held in place by screws 19 into a ledge 21 formed inside the enclosure 12. The building keys can be securely placed under the outside cover but accessible to first responders to gain entry in case of emergency. A conventional NEMA closure 13 as seen in FIG. 1 can receive a tamper evident hasp or padlock, that can be readily breached by a first responder yet deter unauthorized entry. FIG. 1A shows a switch 24 on the inside of the enclosure connected to a battery-powered alarm (not shown in FIG. 1A). The switch 24 closes upon removal of the outside cover 20, activating the alarm whenever the outside cover is removed, deterring improper removal of the outside cover.

A cutout (3.16 inch preferably) opening (See 239 in FIG. 3A) allows connection between the meter hub 14 and the enclosure 12 and provides ample area for the wires from the switch disconnect to attach to the premises wiring. The mating surface of the enclosure 12 allows the enclosure to mate with the meter hub 14 using the conventional four bolt pattern (see item 240 in FIG. 3A) of the meter hub and to maintain the rain-tight connection of both enclosures. Knock-outs provide connection of the power supplied by an alternate source 30 (see FIG. 2).

The premises wiring ground is always attached to the ground electrode. Apparatus that can be used for the isolation function can be as described in U.S. Pat. Nos. 8,803,369 and 7,268,308, the entire disclosures of which are incorporated herein by reference. Those disclosures are particularly useful for installations with more than one source of current including the automatic embodiments shown in FIG. 3 of this disclosure The switch can be configured to have the ability to function for single phase or multi-phase source current. The switch can function using dual-source current, whether that is single or multi-phase current.

Figure 3:
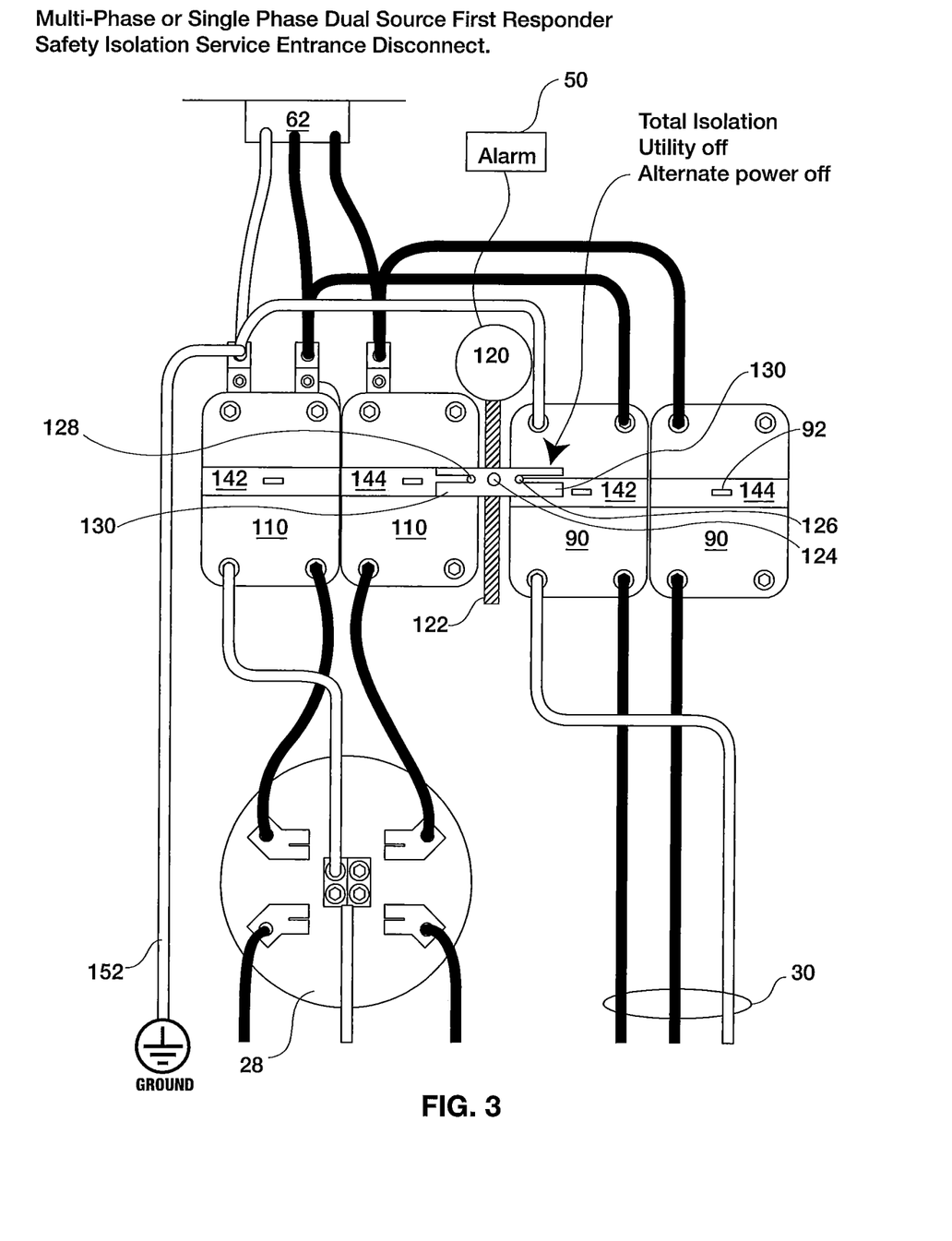
FIG. 3 shows an embodiment in which two sources of current alternately safely supply a load center to the premises, with an automatic mechanism to isolate both the power supplied by a utility grid and the power supplied by an alternate source from the load center while allowing the premises wiring to retain ground circuit to the ground electrode.

The switch can operate as a manual or automatic switch. The automatic switch can receive a signal from a fire alarm 50 (as seen in FIG. 3) to place the switch to the isolation position, removing current from the premises wiring, and also removing the initial heat source in electrically-caused fires.

Figure 2:
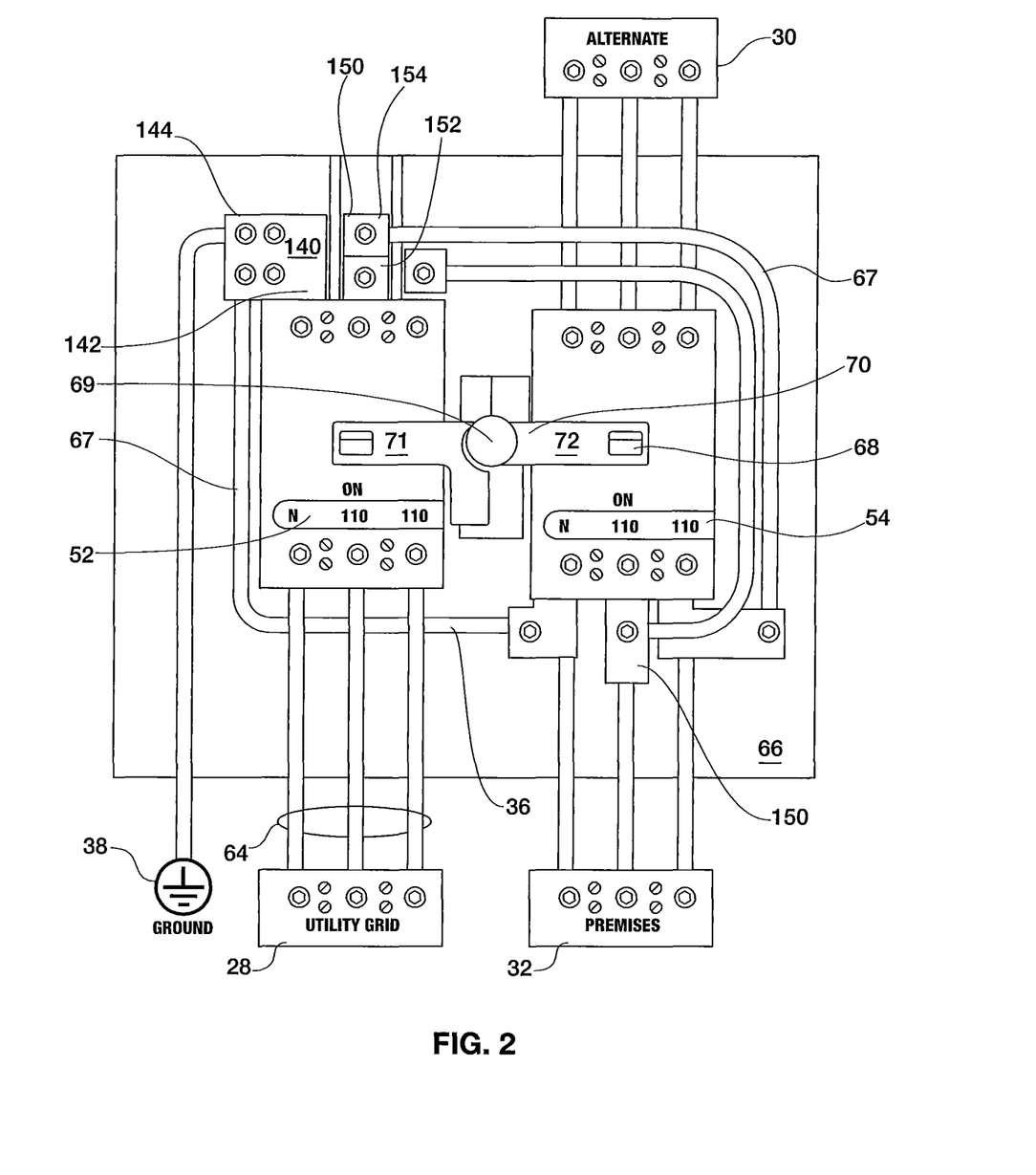
FIG. 2 shows a schematic view of an embodiment for two sources of single phase current safely supplying a load center to the premises, with a manual mechanism to isolate both the power supplied by a utility grid and the power supplied by an alternate source from the load center while allowing the premises wiring to retain the ground circuit to the ground electrode.

FIG. 2 shows how two sources of current can safely supply a load center to the premises 32 and yet supply isolation of those sources. One source of power is a utility grid 28 and the other is an alternate source 30, such as a generator, solar panel or wind turbine. The premises wiring retains ground circuit wire 36 to the ground electrode 38.

The disconnect includes two switches 52 and 54, that are preferably multi-pole circuit breakers with current ratings suitable for the currents they will be handling. The switch 52 has conventional connections 64 to the utility grid 28 (passing through the meter hub 14). The other connections 66 of the switch 52 are jumpered to wiring to the load center serving the building premises hub 32.

Switch 54 also has wiring to the load center serving the premises wiring 32. However, the placement of the switch 54 on the backplate 66 of enclosure 12 is the reverse of the placement of switch 52. Thus, when both switches have their respective operator levers 68 up, current can flow from the grid 28 to the premises 32, but not from the alternate source 30. When the levers 68 are down, current flows from the alternate source 30, but not the grid, to the premises 32.

The switch 54 is mounted on the backplate 66 slightly lower than the switch 52. A lever mechanism 70 mounted on the backplate 66 between the switches 52 and 54 has a knob 69 (also seen in FIG. 1A) atop the lever. Lateral extensions 71 and 72 of mechanism 70 have openings that the operating levers 68 fit into, so the operation of the lever mechanism 70 operates the levers 68. As seen in FIG. 1A, the position of the lever mechanism 70 at its top connects to the utility grid 28 and disconnects the alternate source 30. A middle position of the mechanism 70 disconnects the utility before the alternate source connects, so the load center to the premises 32 is isolated from both sources of current. The ground circuit jumper wire 36 keeps the premises grounded throughout.

As shown in FIG. 3, an automatic control can have a mechanical auger powered by an electric motor to position the switch in the desired position. Actuation of automatic control may be triggered by an alarm 50 which detects smoke or fire in the premises served. As seen in the embodiment of FIG. 3, this embodiment may include a utility grid power source 28 coming through the meter having power cables connected to one of an opposing pair of terminals of a first switch 110 and a neutral or common cable from the grid 28 connected to one of the opposing pairs of terminals of the first switch. Further, there may be an alternate power source 30 connected by a power cable to one of the opposing pair of terminals of the second switch 90 and a neutral or common cable from the alternate power source, also connected to breaker 90. Cables may also extend from the opposing terminals of second switch 90 to the opposing loadside terminals of first switch 110. Power cables extend from the top of first switch 110 (from the other terminal of the pair to which the power cables from the main power source 110 connect) to connect an electrical load 62 such as the load center for the premises. A cable 152 that is grounded at one end connects to the top terminals of the switches 90 and 110.

FIG. 3 shows the power system in a first mode where the utility power 28 is supplying power for the load 62. Auger drive 120 powers an auger 122 to move an alternating pivotal fulcrum 124 that attaches to bars 130 that extend between circuit breakers 90 and 110. The bars 130 distally contact pivots 126 and 128 that are attached to extension bars 142, 144. Extensions bars 142, 144 extend laterally across the face of each of the circuit breakers 110 and 90 and can throw switches 92 found on the circuit breakers. Thus, the disconnect switch includes first and second switches that have an automatic control having a pivotal fulcrum on a utility side to throw the first switch 110 to disconnect a load center from power supplied by a utility grid 28. The switch can include first and second switches that have an automatic control having a pivotal fulcrum on an alternate side to throw the second switch 90 to connect a load center to power supplied by an alternate source 30.

Figure 3A:
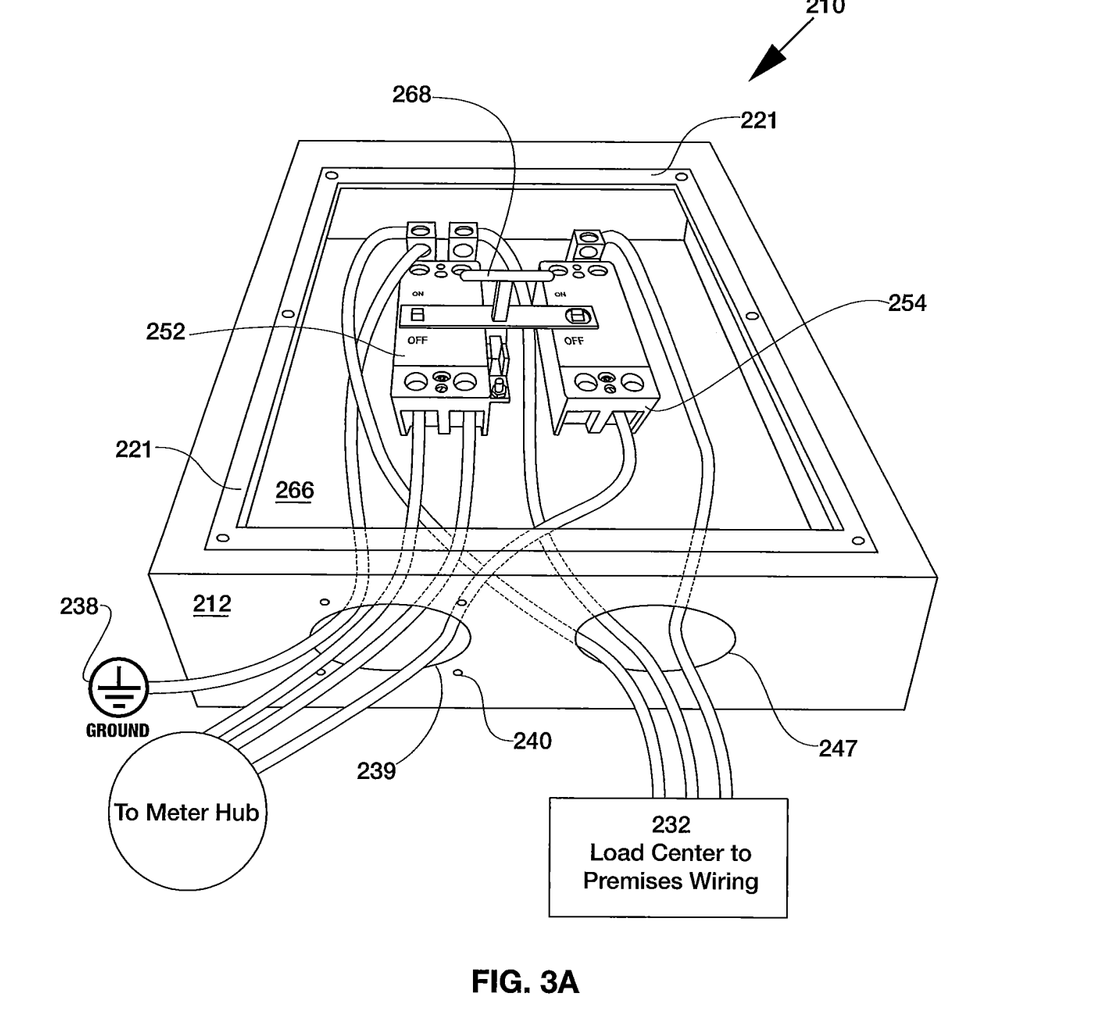
FIG. 3A shows an embodiment for a single phase, single source.

A single source isolation device 210 is seen in FIG. 3A. An enclosure 212 like the enclosure shown before has a cutout 239 and four holes 240 to receive a conventional meter hub connection. A knockout 247 provides a path for the wires to the load center 232 to the premises wiring. This view more clearly shows the ledge 221 inside the enclosure, but the dead front cover and outer cover have both been removed so the operational items can be seen within the enclosure 212. Two circuit breakers 252 and 254 are mounted to the backplate 266 of the enclosure. In this instance the two breakers are mounted so they are both closed when the lever handle 268 has moved their operating levers upward and both open when they are moved downward. In this view the incoming source wiring (typically from the utility grid by way of the meter hub) includes the three wires shown connected to the bottoms of the circuit breakers. The premises wiring is connected at the tops of the circuit breakers, along with the ground wire, which is also connected to the ground 238. As before, the wire bend reducers can make the wire connections easier. As can be seen, the premises wiring 232 is always connected to the ground 238, regardless of the status of the breakers 252, 254.

Both the single source and dual source current are controlled by use of a single control while providing total isolation of the premises wiring in the off and isolation position. Both switches remove the source current ground from the premises wiring in the off and isolation position. Both switches operate separately while isolating the source current that is not supplying the premises wiring.

When the utility (grid power) is supplying the premises wiring, the power supplied by an alternate source is off and isolated. When the power supplied by an alternate source is supplying the premises wiring, the utility (grid power) is off and isolated. By isolating or not allowing each source to share a single circuit, back feeding is impossible, protecting line repair personnel from electrocution by current from the power supplied by an alternate source. The Emergency Dual Isolation Service Entrance Switch serves as the service entrance disconnect for both sources of power.

The Emergency Isolation Service Entrance Switch functions as the service entrance disconnect for the power from the grid in single source power. In the Isolation position, connection to the premises wiring is opened, including opening the source current ground of both sources of current ground of both sources of current, but the ground for the premises wiring remains intact to the ground electrode at times.

Both the Isolation Service Entrance Switch and the Dual Isolation Service Entrance Switch meet code requirements of the National Electrical Code (NEC) by complying with code 230.74 and code 230.75, and remove the source current ground from the premises wiring. They both meet the requirements of NFPA by being placed on the exterior of the building to protect first responders. They meet the requirements of OSHA by removing the known hazard of electrical shock which can cause cardiac arrest. They meet the requirements of UL in order to function safely.

Figure 4:
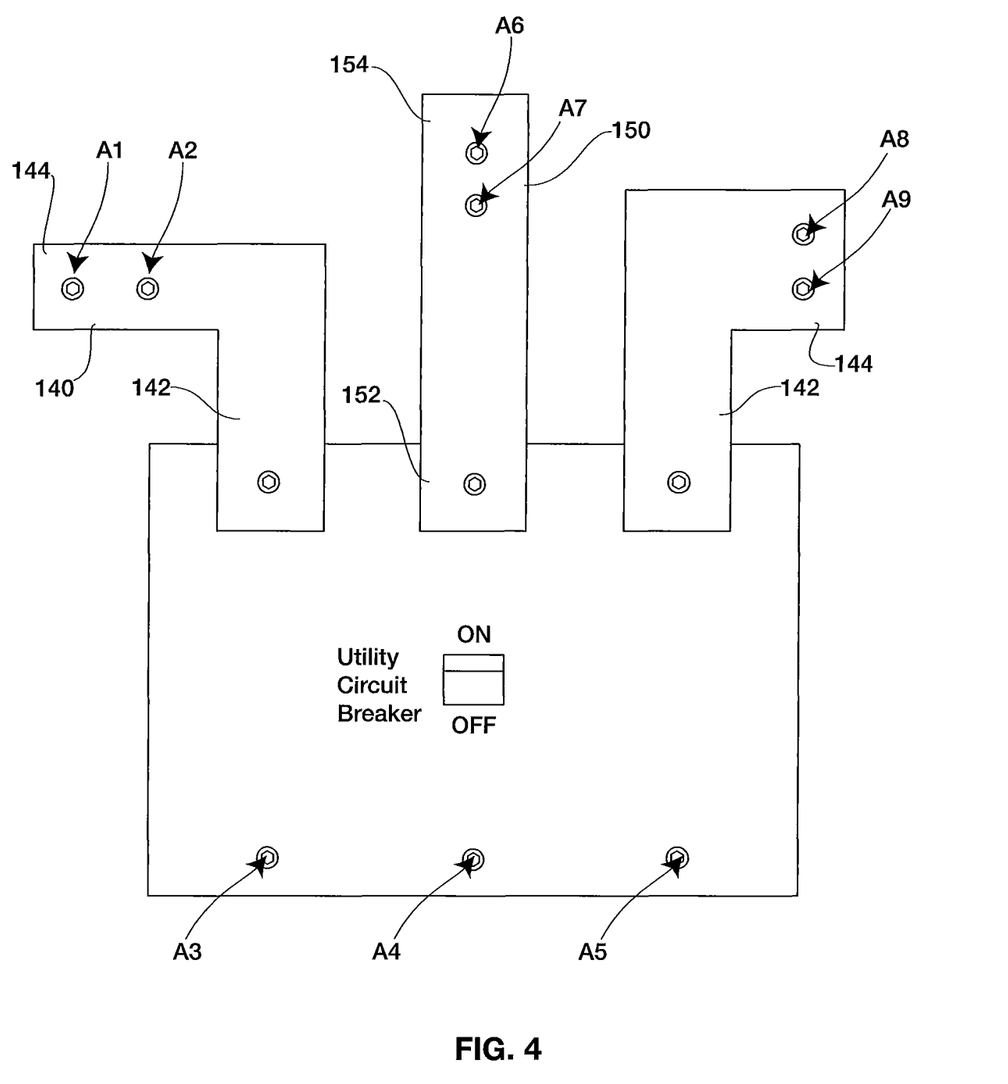
FIG. 4 shows the design of wire bend units to allow the use of a smaller enclosure and easier assembly and to aid in installation.

As seen in FIGS. 2 and 4, novel wire bend reducers make assembly and installation possible. The novel wire bend reducers are fabricated to attach to existing circuit breakers using the 5/16 in. bolt pattern used for lug connection. The wire bend reducers are fabricated from 2.5 inch flat stock aluminum. The reducers do not add circuit resistance at the breaker and use any voltage or amp required by the load center. The reducers are designed for each connection to allow ease of installation and reduce the wire bend demand.

One of the wire bend reducers 140 may be L-shaped with one leg 142 of the L-shaped wire bend reducer connected to a pole of a circuit breaker and an upstanding leg 144 of the L-shaped wire bend reducer connected at two points to wires.

The other wire bend reducer 150 is U-shaped with one leg 152 of the U-shaped wire bend reducer suited for connecting to a pole of a circuit breaker and a laterally extending leg 154 of the U-shaped wire bend reducer connected at two points to wires. For a three-pole breaker, one reducer 140 can be used for the outer two poles and one wire bend reducer 150 can be used in the middle pole.

The design of the 3R Rain tight enclosure provides the necessary space to meet clearance requirements of UL and mates to the meter hub with sufficient area to allow the wiring to pass through the two 3R Rain Tight enclosures. The 3.25 inch opening allows the three wire power from the meter hub to the circuit breaker, which serves as the overload protection and open circuit for the power. The power to the premises wiring passes through this opening and is open circuited by the circuit breaker. The open circuit removes the heat source in electrical fires and removes the hazard of cardiac arrest to first responders.

The 3R rain tight enclosure is designed to mate to existing meter hubs using a conventional four bolt pattern of the existing meter hub, requires only 6 wire connections and does not disrupt the wiring connections in the load center that serves the wiring to the premises. In an aftermarket installation, electrical inspection of only 6 wire connection is needed because the load center connections are not disturbed. A 3.16 inch cut-out provides ample area to allow premises wiring connection to the switch and switch wiring connection to the meter.

Figure 5:
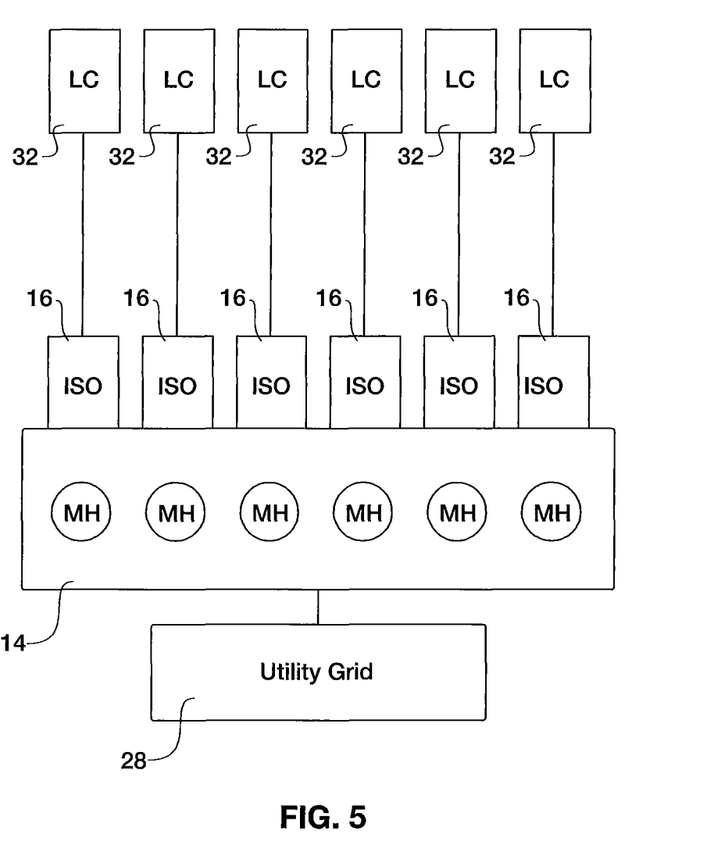
FIG. 5 is a schematic view showing multiple emergency safety isolation disconnects that are installed for respective units of a multi-unit facility.

The switch can be installed up-stream or down-stream of the meter hub to supply single or multi-meter current supply. In a multi-unit building (such as an apartment building or condominium), a separate First Responder Emergency Safety Isolation Disconnect 16 can be installed for the load centers of the premises wiring 32 for each of the building units, downstream of the meter hub 14 for that unit, as shown in FIG. 5.

Figure 6:
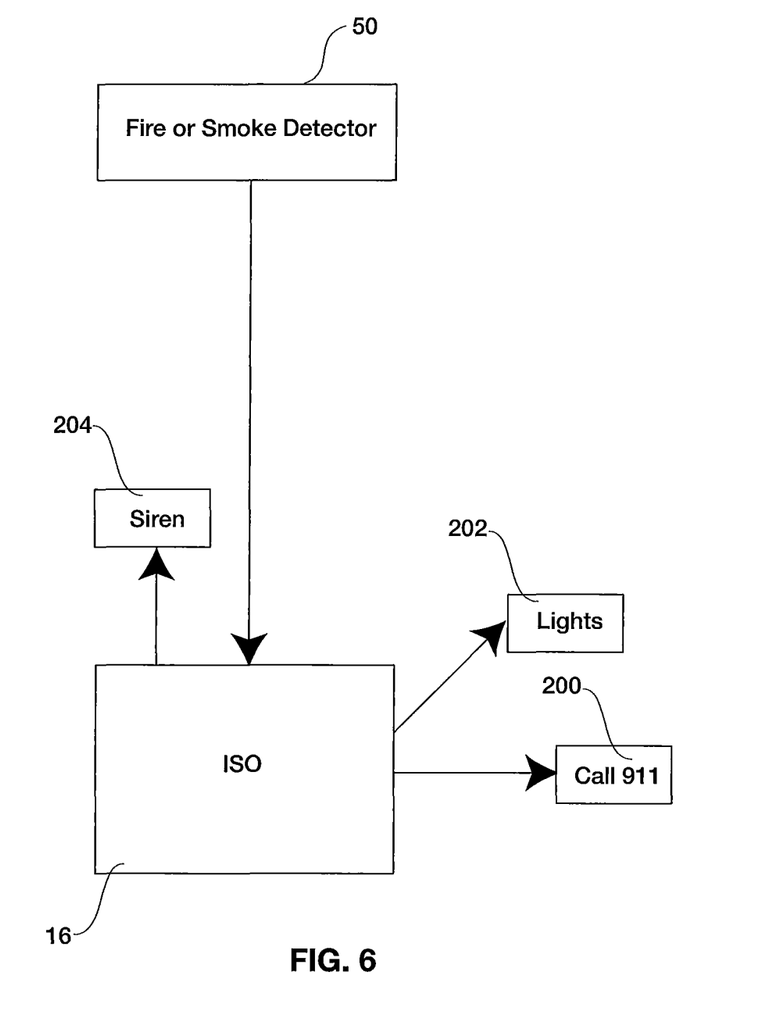
FIG. 6 is a schematic view showing an alarm that triggers when the disconnect is actuated.

A manual disconnect control may activate an alarm and alert system, alerting people of the fire and aiding in evacuation of anyone in the fire area while reducing response time of first responders. As seen in FIG. 6, the meter hub safety isolation service entrance disconnect switch 16 may have an alarm that triggers when the switch is actuated. The alarm can be any of various options, such as calling an emergency service (such as 911) 200, turning on lights 202, sounding a siren 204, and more than one of them.

As seen in FIG. 1A, a switch 24 on the inside of the enclosure 12 can be connected to a battery-powered alarm, so the alarm is activated whenever the outside cover 20 is removed, deterring improper removal of the outside cover. The alarm can also be triggered by actuating the First Responder Emergency Safety Isolation Disconnect or ae signal from a smoke or fire detector. As seen in FIG. 6, the alarm can take the form of calling an emergency service like 911, turning on lights, sounding a siren, and more than one of them. The lights and/or siren can alert those in the area of the emergency and to aid in rapid evacuation and aid rescue and emergency personnel and reduce response time. The signal from the smoke or fire detector may also trigger an automatic switch to remove electrical current.

Figure 7:
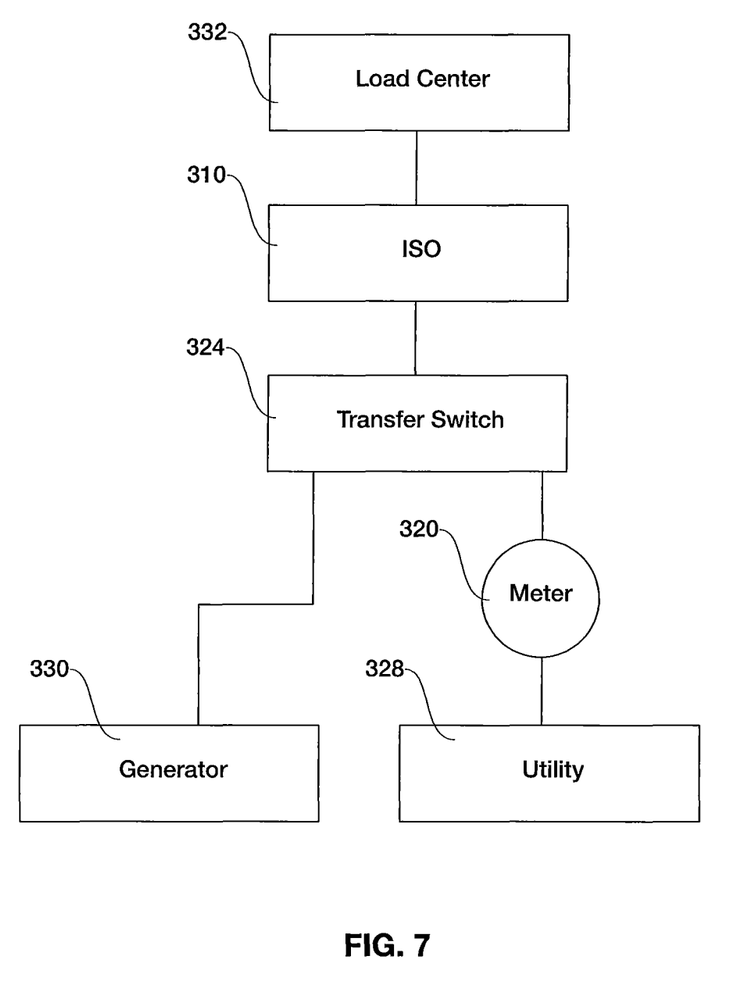
FIG. 7 is a schematic view showing the arrangement of items in a dual source configuration that allows isolation by a single source disconnect switch.

FIG. 7 shows a schematic view allowing a single pole isolation service entrance disconnect switch to serve for a dual current source situation. In this case the sources are the utility grid 328 and the generator 330. The utility is connected through the meter hub 320 to a transfer switch 324, and the generator 330 is connected to the transfer switch 324. The transfer switch can be any suitable transfer switch but preferably is capable of preventing back-feeding of current from the generator to the utility grid, as is disclosed in my prior US patents mentioned above. The output of the transfer switch is applied to the single pole isolation service entrance disconnect switch 310, which in turn serves the load center 332 for the premises wiring. Whichever source of the current the transfer switch may be passing can be thus prevented from reaching the premises by using the service entrance disconnect switch 310. The service entrance disconnect switch 310 can be as described above in connection with FIG. 3A.

Figure 8:
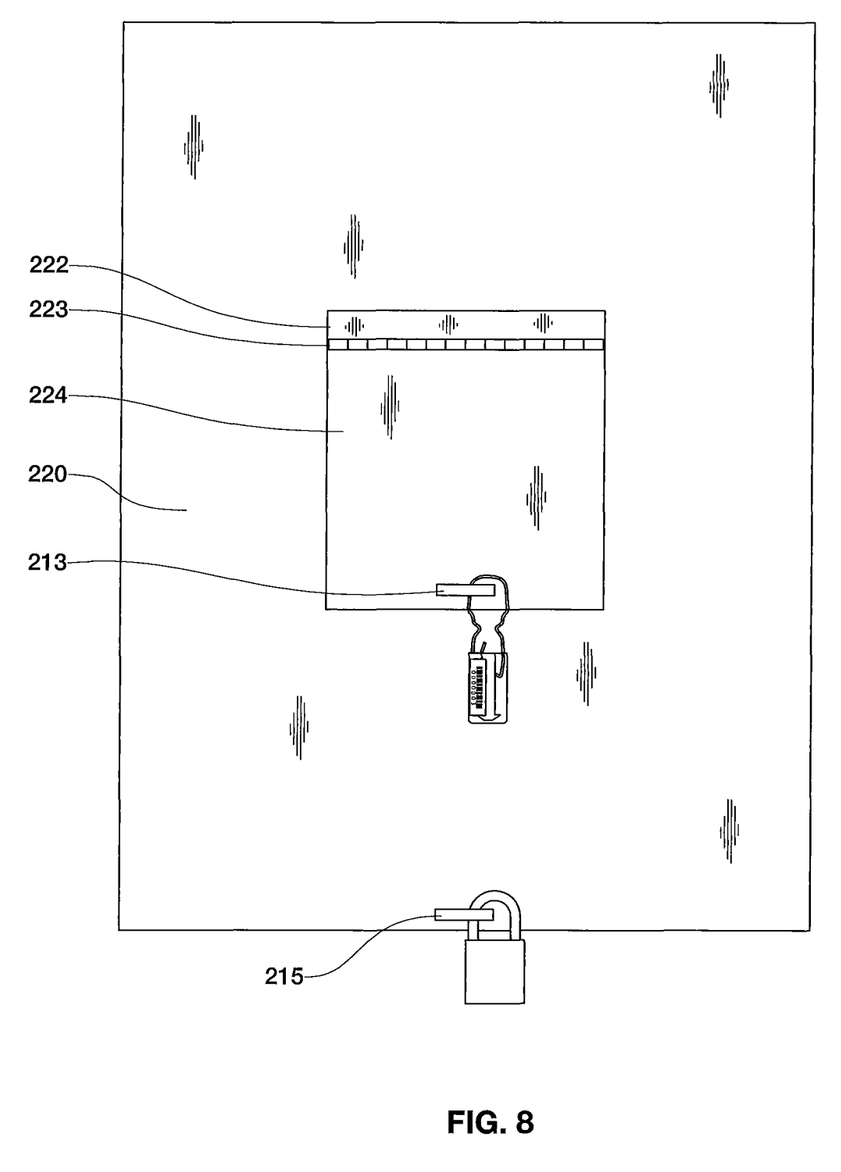
FIG. 8 is a front view of an alternate outer cover enabling separate homeowner and first responder access to the isolation service entrance disconnect switch.

FIG. 8 is a front view of an alternate outer cover enabling separate homeowner and first responder access to the isolation service entrance disconnect switch. That is, the outside cover has a door to provide access to the disconnect switch. This embodiment differs from FIG. 7 by allowing one switch to perform the function of transfer switch and disconnect switch. In this embodiment the outside cover 220 has a metal flange 222 welded to it or affixed in some other fashion. A metal door 224 is connected to the flange 222 at a piano hinge 223. A hasp 213 holds the door closed, and an unnumbered telltale closure fits into the hasp 213. The first responder can get access to the switch (such as the switch shown in FIGS. 1A and 2) when needed. The cover 220 has its own hasp 215 and unnumbered padlock, providing access to the enclosed switch for the homeowner, who has the padlock key or combination. The roles of the door 224 and removable cover 220 can be reversed, if desired. Other structures for providing homeowners and first responder's individualized access to the switch will be readily apparent to those in the art.

Embodiments of the invention may provide one or more of these features and benefits:

1. Meets the needs of First Responders by removing electrical current from the work space to prevent the hazard of electrical shock and possible cardiac arrest.

2. Protects emergency line repair persons from the hazard of electrocution from back-fed current from power supplied by an alternate source.

3. Protects Power Company employees from flash arc when meters are replaced.

4. Allows First responders to safely remove power from the workspace using one easily accessible control.

5. Provides the owner with a secure option of supplying a fire department a means of obtaining emergency entry in the event of fire or emergencies.

6. Allows the removal of the heat source in electrically caused fires.

7. Reduces the fire loss due to electrically caused fire by removing the heat source.

8. The switch allows easy installation. The Switch is designed to mate to existing meter hubs using the four bolt pattern of the existing meter hubs.

9. The switch requires only 6 wire connections at the meter hub and does not disrupt any wire connections in the load center. Electrical inspections consist of 6 wire connections.

10. The switch may have the ability of automatic control to remove electrical current by using a signal from a smoke alarm.

11. The switch may allow rapid response and evacuation of occupants and reduces response time of first responders.

12. The Switch may meet the requirements of NEC by opening poles that it controls to include the neutral and ground circuits to provide total isolation of the premises wiring from current sources.

13. The switch may meet the requirements of NFPA to allow first responders a safe means to remove current from the premise wiring to comply with OSHA article 1910 and article 1926 and prevent cardiac arrest from electrical shock.

14. The switch may meet NEC requirements to remove both source current grounds in dual source current with one control.

15. The switch may meet OSHA requirements for complying with article 1910 and article 1926 for workplace safety.

16. The switch may requirements of UL to function safely.

17. The switch may qualify for reduced insurance rates.

18. The switch may be required by financial institutions to protect collateral or investments as a lender.

19. The switch may be required by the fire departments to protect fire fighters and first responders.

20. The switch may be required by power companies to protect their employees.

21. The switch may replace the need for a temporary service during construction.

22. The switch may allow use of a power supplied by an alternate source before grid connection.

23. The switch may have the ability to save lives and property by activating a system of alarm and alert system to include dialing 911 and turning on lights and siren to alert those in the area of the emergency and to aid in rapid evacuation and aid rescue and emergency personnel and reduce response time.

24. A device able to be constructed using UL listed circuit breakers or newly fabricated devices, which make use of voltage capacitors or surge suppressors to eliminate arc flash during operation.

25. A device that can operate up stream or downstream of the meter hub to control source current in multi meter current operations.

26. A device that allows the meter hub to be a permanent (i.e. not temporary) installation. Alternatively, a meter hub unit can serve temporarily, such as for a short term installation or during new construction, allowing power to be supplied by an alternate source before power grid connection.

What is claimed is:

1. A meter hub safety isolation service entrance housing for a disconnect switch comprising:
   an enclosure configured to mount on a wall on the outside of a building adjacent a meter hub and protect contents of the enclosure from ingress of solid foreign objects or the ingress of rain, sleet, or snow and that will be undamaged by the external formation of ice on the enclosure,
   the enclosure having a dead front cover and openable outside cover in which the outside cover is marked to indicate that the enclosure contains a disconnect switch,
   the disconnect switch within the enclosure and being operable upon opening of the outside cover while the dead front cover remains in place and comprising a multi-pole switch having power, neutral and ground poles that are under the dead front cover, the multi-pole switch opening the power and neutral poles upon actuation by an actuator that is exposed above the dead front cover when the outside cover is open.

2. The meter hub safety isolation service entrance housing for a disconnect switch as claimed in claim 1 wherein the actuator is a lever.

3. The meter hub safety isolation service entrance housing for a disconnect switch as claimed in claim 1 wherein the disconnect switch is not operable while the outside cover is closed.

4. The meter hub safety isolation service entrance housing for a disconnect switch as claimed in claim 1 wherein the emergency isolation disconnect switch includes first and second switches for multiple poles and a linkage between the first and second switches configured such that one of the first and second a switches closes while the other of the first and second switches remains open.

5. The meter hub safety isolation service entrance housing for a disconnect switch as claimed in claim 4 wherein the first and second switches are circuit breakers having wire bend reducers interposed between poles of the circuit breakers and wires that are electrically connected to the circuit breakers.

6. The meter hub safety isolation service entrance housing for a disconnect switch as claimed in claim 5 wherein one of the wire bend reducers is L-shaped with one leg of the L-shaped wire bend reducer connected to a pole of a circuit breaker and an upstanding leg of the L-shaped wire bend reducer connected at two points to wires.

7. The meter hub safety isolation service entrance housing for a disconnect switch as claimed in claim 5 wherein one of the wire bend reducers is a U-shaped with one leg of the U-shaped wire bend reducer connected to a pole of a circuit breaker and a laterally extending leg of the U-shaped wire bend reducer connected at two points to wires.

8. The meter hub safety isolation service entrance housing for a disconnect switch as claimed in claim 1 wherein the disconnect switch includes first and second switches having a mechanism configured to power a pivotal fulcrum for positioning an extension about the switches for moving the switches independently between open and closed positions.

9. The meter hub safety isolation service entrance housing for a disconnect switch as claimed in claim 1 wherein the enclosure is configured to mount adjacent a separate housing for a meter hub.

10. The meter hub safety isolation service entrance housing for a disconnect switch as claimed in claim 2 wherein the enclosure has a cut-out for mating to a separate housing for a meter hub using a four bolt pattern.

11. The meter hub safety isolation service entrance housing for a disconnect switch as claimed in claim 9 wherein the enclosure has a knockout to form a hole for wires for power supplied by an alternate source.

12. The meter hub safety isolation service entrance housing for a disconnect switch as claimed in claim 1 wherein the disconnect switch is wired so that the multi-pole switch removes current from a premises wiring to protect First Responders during emergencies while maintaining a ground connection to the premises wiring.

13. The meter hub safety isolation service entrance housing for a disconnect switch as claimed in claim 1 wherein the disconnect switch is wired so that the multi-pole switch removes current from a premises wiring to protect line repair men repairing downed power lines by making back feeding impossible.

14. The meter hub safety isolation service entrance housing for a disconnect switch as claimed in claim 1 wherein the multi-pole switch supplies a load center with voltage and amperage from a utility grid.

15. The meter hub safety isolation service entrance housing for a disconnect switch as claimed in claim 1 wherein the multi-pole switch supplies a load center with voltage and amperage from power supplied by an alternate source.

16. The meter hub safety isolation service entrance housing for a disconnect switch as claimed in claim 1 wherein the disconnect switch isolates power supplied by a utility grid from an alternate source of power.

17. The meter hub safety isolation service entrance housing for a disconnect switch as claimed in claim 1 wherein the disconnect switch isolates a load center from power supplied by a utility grid including current carrying conductors including the neutral and ground circuits while maintaining a wiring ground of the load center connected to the ground electrode.

18. The meter hub safety isolation service entrance housing for a disconnect switch as claimed in claim 1 wherein the disconnect switch isolates power supplied by an alternate source from a load center including current carrying conductors and neutral and ground circuits while maintaining the load center ground connected to the ground electrode.

19. The meter hub safety isolation service entrance housing for a disconnect switch as claimed in claim 1 wherein the disconnect switch shares the ground electrode with a load center and power supplied by a utility grid while the power supplied by an alternate source is off and completely isolated.

20. The meter hub safety isolation service entrance housing for a disconnect switch as claimed in claim 1 wherein the disconnect switch shares a ground electrode with a load center and the power supplied by an alternate source, with power supplied by a utility grid off and completely isolated.

21. The meter hub safety isolation service entrance housing for a disconnect switch as claimed in claim 1 wherein the power supplied by an alternate source supplies a load center while the power supplied by a utility grid is off and isolated.

22. The meter hub safety isolation service entrance housing for a disconnect switch as claimed in claim 1 wherein the disconnect switch has three positions with one position allowing the power supplied by a utility grid to supply current to a load center, while power supplied by an alternate source is off and completely isolated.

23. The meter hub safety isolation service entrance housing for a disconnect switch as claimed in claim 1 wherein the disconnect switch allows isolation between the power supplied by a utility grid while power is supplied by an alternate source, and premises wiring in the off and isolated position while the ground to the premises wiring remains intact to the ground electrode.

24. The meter hub safety isolation service entrance housing for a disconnect switch as claimed in claim 1 wherein the disconnect switch has an automatic control to operate automatically.

25. The meter hub safety isolation service entrance housing for a disconnect switch as claimed in claim 24 wherein the automatic control has a mechanical auger powered by an electric motor to position the multi-pole switch in a desired position.

26. The meter hub safety isolation service entrance housing for a disconnect switch as claimed in claim 24 wherein the automatic control has a solenoid to position the multi-pole switch in a desired position.

27. The meter hub safety isolation service entrance housing for a disconnect switch as claimed in claim 24 wherein the automatic control includes means to position the multi-pole switch in a desired position.

28. The meter hub safety isolation service entrance housing for a disconnect switch as claimed in claim 1 wherein the switch has an alarm that triggers when the disconnect switch is actuated.

29. The meter hub safety isolation service entrance housing for a disconnect switch as claimed in claim 21 wherein the alarm is selected from the group consisting of calling an emergency service, turning on lights, sounding a siren, and more than one of them.

30. The meter hub safety isolation service entrance housing for a disconnect switch as claimed in claim 1 wherein the multi-pole switch includes first and second switches that have an automatic control having a pivotal fulcrum on a utility side to throw the first switch to disconnect a load center from power supplied by a utility grid.

31. The meter hub safety isolation service entrance housing for a disconnect switch as claimed in claim 1 wherein the multi-pole switch includes first and second switches that have an automatic control having a pivotal fulcrum on an alternate side to throw the second switch to connect a load center to power supplied by an alternate source.

32. The meter hub safety isolation service entrance housing for a disconnect switch as claimed in claim 31 wherein the first and second switches have an automatic control and the automatic control is able to choose which fulcrum to use or the alternating pivotal fulcrum.

33. The meter hub safety isolation service entrance housing for a disconnect switch as claimed in claim 1 wherein the multi-pole switch has a voltage capacitor or surge suppressor to eliminate arc flash during operation.

34. The meter hub safety isolation service entrance housing for a disconnect switch as claimed in claim 1 wherein the multi-pole switch is in the form of at least one circuit breaker to provide overload protection.

35. The meter hub safety isolation service entrance housing for a disconnect switch as claimed in claim 1 wherein the multi-pole switch meets National Electrical Code 230.74 by opening all poles to provide isolation of wiring of a premises from power supplied by a utility grid and power supplied by an alternate source while maintaining a ground connection of the wiring of the premises.

36. The meter hub safety isolation service entrance housing for a disconnect switch as claimed in claim 1 wherein the multi-pole switch meets National Electrical Code 230.75 by removing source current that may flow from a utility grid ground or from an alternate source ground from a premises wiring while allowing premises wiring to remain connected to ground.

37. The meter hub safety isolation service entrance housing for a disconnect switch as claimed in claim 1 wherein the enclosure can interface with an existing meter hub or a new meter hub.

38. The meter hub safety isolation service entrance housing for a disconnect switch as claimed in claim 1 wherein the multi-pole switch has at least one wire bend reducer to enable easy assembly and installation.

39. The meter hub safety isolation service entrance housing for a disconnect switch as claimed in claim 1 wherein the multi-pole switch includes first and second switches and the actuator is a single lever to operate the multi-pole switch to disconnect sources of current in a dual source current supply to enable one actuator to isolate both sources of current from premises wiring.

40. The meter hub safety isolation service entrance housing for a disconnect switch as claimed in claim 1 wherein the disconnect switch allows a meter hub to be removed safely by opening all circuits and preventing current flow at the meter.

41. The meter hub safety isolation service entrance housing for a disconnect switch as claimed in claim 1 wherein a plurality of disconnect switches can be mounted downstream of the meter hub so a multi-pole switch in each enclosure can control source current in multi meter current operations.

42. The meter hub safety isolation service entrance housing for a disconnect switch as claimed in claim 1 wherein the disconnect switch permits a meter hub unit to serve as a temporary or permanent service entrance disconnect switch for new construction to allow power supplied by an alternate source before power grid connection.

43. The meter hub safety isolation service entrance housing for a disconnect switch as claimed in claim 1 wherein the multi-pole switch includes first and second switches that allow a safe way to furnish dual source current for cases that require electrical supply.

44. The meter hub safety isolation service entrance housing for a disconnect switch as claimed in claim 1 wherein the outside cover has a door to provide access to the disconnect switch.

45. A meter hub safety isolation service entrance housing for a disconnect switch as claimed in claim 1 comprising:
an automatic control including means to position the multi-pole switch in a closed position and to receive a signal to open the power and neutral poles of the multi-pole switch.

46. The meter hub safety isolation service entrance housing for a disconnect switch as claimed in claim 45 wherein the automatic control includes a mechanical auger powered by an electric motor to position the multi-pole switch in a desired position.

47. The meter hub safety isolation service entrance housing for a disconnect switch as claimed in claim 46 wherein the automatic control includes a solenoid to position the multi-pole switch in a desired position.

48. The meter hub safety isolation service entrance housing for a disconnect switch as claimed in claim 45 wherein the disconnect includes first and second switches and the automatic control has a pivotal fulcrum on a utility side to throw the first switch to disconnect a load center from power supplied by a utility grid.

49. The meter hub safety isolation service entrance housing for a disconnect switch as claimed in claim 45 wherein the disconnect includes first and second switches and the automatic control has a pivotal fulcrum on an alternate side to throw the second switch to connect a load center to power supplied by an alternate source.

* * * * *